(12) United States Patent
LeCrone et al.

(10) Patent No.: US 12,019,521 B2
(45) Date of Patent: Jun. 25, 2024

(54) LOGICAL BACKUP USING A STORAGE SYSTEM

(71) Applicant: EMC IP Holding Company LLC, Hopkinton, MA (US)

(72) Inventors: Douglas E. LeCrone, Hopkinton, MA (US); Brett A. Quinn, Lincoln, RI (US)

(73) Assignee: EMC IP Holding Company LLC, Hopkinton, MA (US)

( * ) Notice: Subject to any disclaimer, the term of this patent is extended or adjusted under 35 U.S.C. 154(b) by 268 days.

(21) Appl. No.: 16/774,369

(22) Filed: Jan. 28, 2020

(65) Prior Publication Data

US 2021/0232458 A1 Jul. 29, 2021

(51) Int. Cl.
*G06F 11/14* (2006.01)
*G06N 20/00* (2019.01)
*G11B 5/008* (2006.01)

(52) U.S. Cl.
CPC ......... *G06F 11/1451* (2013.01); *G06N 20/00* (2019.01); *G11B 5/00813* (2013.01); *G06F 2201/80* (2013.01)

(58) Field of Classification Search
CPC ....... G06F 11/14; G06F 2201/80; G06F 16/16
See application file for complete search history.

(56) References Cited

U.S. PATENT DOCUMENTS

| | | | |
|---|---|---|---|
| 8,601,209 B1 * | 12/2013 | LeCrone | G06F 11/2094 711/111 |
| 10,810,088 B1 * | 10/2020 | Gu | G06F 11/1464 |
| 2009/0276590 A1 * | 11/2009 | Nagaraj | G06F 11/1464 711/E12.001 |
| 2011/0258381 A1 * | 10/2011 | Rossi | G06F 11/2082 711/114 |
| 2012/0079325 A1 * | 3/2012 | Riegel | G06F 11/3457 714/38.1 |
| 2015/0081641 A1 * | 3/2015 | Brewer | G06F 11/1458 707/654 |
| 2017/0168903 A1 * | 6/2017 | Dornemann | G06F 11/2097 |
| 2018/0232245 A1 * | 8/2018 | Aseev | G06F 8/30 |
| 2019/0188380 A1 * | 6/2019 | Animireddygari | G06F 11/1469 |
| 2020/0042398 A1 * | 2/2020 | Martynov | G06F 3/0605 |
| 2020/0349026 A1 * | 11/2020 | Chopra | G06F 16/2365 |

* cited by examiner

*Primary Examiner* — Maher N Algibhah
(74) *Attorney, Agent, or Firm* — Muirhead and Saturnelli, LLC (57) ABSTRACT

Backing up logical data from a storage system to a backup system includes accessing data on the storage system corresponding to logical file structures of data stored on the storage system, using machine learning to ascertain file access patterns and frequency of file backups, determining backup data based on the logical file structure of data stored on the storage system and the file access patterns and frequency of file backups, and directly transferring data corresponding the backup data from the storage system to the backup system. The logical file structures may be provided by file metadata. The file metadata may include at least one of: a VTOC (volume table of contents), an IXVTOC (indexed VTOC), VSAM (virtual storage access method) information, a VVDS (VSAM volume data set), file attributes, and/or catalog data. The file attributes may include management class information for each of the files.

18 Claims, 7 Drawing Sheets

LOGICAL BACKUP USING A STORAGE SYSTEM

BACKGROUND

1. Technical Field

This application relates to computer storage systems, and more particularly to the field of backing up data in storage systems.

2. Description of Related Art

A significant number of mainframe applications that access tape drive data are still in use. In many cases, tape drives have been replaced by hardware and/or software that provides tape drive simulation/emulation. For example, the DLm tape emulation unit provided by Dell EMC of Hopkinton, MA provides tape drive functionality to applications in a host system coupled thereto (e.g., an IBM System z host device). Thus, applications running on a host system using a DLm (or similar tape emulation unit) send tape commands and data thereto and receive tape data and status as if the applications were communicating with an actual tape drive. The DLm may include non-volatile storage (e.g., a disk array) to store tape data and tape emulation information.

Tape drives are often used to backup data on storage systems used by mainframe computers. Generally, mainframe systems provide physical backups or logical backups to tape drives. Physical backups are associated with both volume and file level operations where CKD tracks are read from storage systems in a physical form HA/R0/R1-Rx using CCWs such as Read Count Key Data (RCKD), Read Track (DE), or Read Track Data (RTD). The resulting track image from the storage system is then written to a tape drive (most likely a tape emulation unit, like the DLm) in a raw format corresponding to data read from the track. Logical backups are associated with individual files rather than a particular volume, even though it is possible to logically backup all files on a volume. In the case of a logical backup, the data is read like just as with a physical backup, but then the data processed and written out to tape in data format corresponding to the actual files rather than simply writing raw track data as in a physical backup. For a logical backup, the structure of the files is checked and then only the used space is processed so that a logical backup may use much less space than a physical backup because the physical backup must provide backup space for an entire volume. For partitioned data sets, the file directory may be structurally validated and then only valid/active members may be backed up. For virtual sequential access methods and corresponding different file types, many different integrity checks/validations may be performed. In some cases, a logical backup may be unique for different file types.

Despite the many advantages of logical backups over physical backups, logical backups may be disadvantageous because logical backups require interpretation and processing of directory information, which is usually handled by a host device (e.g., a mainframe computer). In such systems, the host device identifies files to be backed up, reads the data from a storage system (e.g., a disk array device) and then writes the data to a tape unit (e.g., a tape emulation unit, such as a DLm). Using the host to transfer data between the storage system and the tape unit is relatively inefficient since the host is acting mainly as a conduit that directs data transfers from the storage system and the tape unit.

Accordingly, it is desirable to provide a backup system that logically backs up data from a storage system directly to backup storage without requiring a host (or similar) to facilitate the transfer or to perform logical processing of the data.

SUMMARY OF THE INVENTION

According to the system described herein, backing up logical data from a storage system to a backup system includes accessing data on the storage system corresponding to logical file structures of data stored on the storage system, using machine learning to ascertain file access patterns and frequency of file backups, determining backup data based on the logical file structure of data stored on the storage system and the file access patterns and frequency of file backups, and directly transferring data corresponding the backup data from the storage system to the backup system. The logical file structures may be provided by file metadata. The file metadata may include at least one of: a VTOC (volume table of contents), an IXVTOC (indexed VTOC), VSAM (virtual storage access method) information, a VVDS (VSAM volume data set), file attributes, and/or catalog data. The file attributes may include management class information for each of the files. The management class information may include data indicating number of backups, frequency of backups, and backup priority. The management class information may be read directly from an SMS (system managed storage) management class definition. The SMS management class definition may be stored on the storage system. Backing up logical data from the storage system to the backup system may be initiated by a host computing system coupled to the storage system. The backup system may be a tape unit. The tape unit may be a tape emulation unit.

According further to the system described herein, a non-transitory computer readable medium contains software that backs up logical data from a storage system to a backup system. The software includes executable code that accesses data on the storage system corresponding to logical file structures of data stored on the storage system, executable code that ascertains file access patterns and frequency of file backups, executable code that determines backup data based on the logical file structure of data stored on the storage system and the file access patterns and frequency of file backups, and executable code that directly transfers data corresponding the backup data from the storage system to the backup system. The logical file structures may be provided by file metadata. The file metadata may include at least one of: a VTOC (volume table of contents), an IXVTOC (indexed VTOC), VSAM (virtual storage access method) information, a VVDS (VSAM volume data set), file attributes, and/or catalog data. The file attributes may include management class information for each of the files. The management class information may include data indicating number of backups, frequency of backups, and backup priority. The management class information may be read directly from an SMS (system managed storage) management class definition. The SMS management class definition may be stored on the storage system. Backing up logical data from the storage system to the backup system may be initiated by a host computing system coupled to the storage system. The backup system may be a tape unit. The tape unit may be a tape emulation unit.

DETAILED DESCRIPTION OF VARIOUS EMBODIMENTS

The system described herein provides a mechanism to back up logical data directly from a storage system to a backup system, such as a tape unit. The storage system accesses file metadata stored thereon and uses machine learning to determine logical file structures as well as relevant backup information such as frequency, time of last backup, etc.

Figure 1:
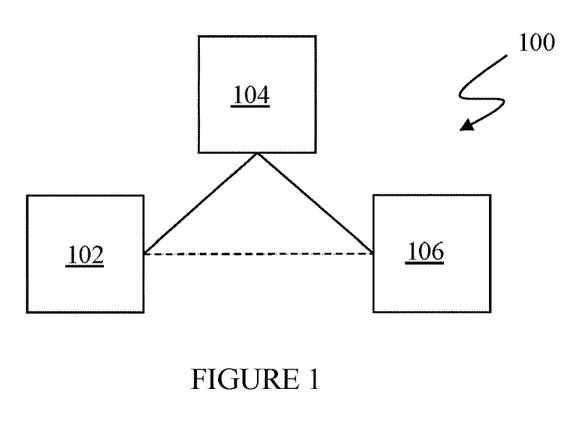
FIG. 1 is a schematic diagram showing a host, a storage system, and a tape emulation device used in connection with an embodiment of the system described herein.

Referring to FIG. 1, a diagram 100 shows a host 102 coupled to a storage system 104 that is coupled to a tape unit 106. The host 102 may be any appropriate computing system, such as an IBM System z computing system. The storage system 104 may be any storage system capable of providing the functionality described herein, such as Symmetrix storage array provided by EMC Corporation of Hopkinton, MA. The tape unit 106 may be any physical tape unit or may be a tape emulation unit that provides tape emulation functionality so that a device writes tape data and commands to the tape emulation unit 106 and reads tape data and status information from the tape emulation unit 106 as if the tape emulation unit 106 were an actual computer tape device. The tape unit 106 may be implemented using any appropriate device, such as the DLm tape emulation device provided by EMC Corporation of Hopkinton, MA. The tape unit 106 may also correspond to any out-of-band (OOB) storage mechanism that represents additional storage capability beyond storage capabilities provided by the storage system 104. In an embodiment herein, data is exchanged with the tape unit 106 using any appropriate format. Note that, although only a single host 102, a single storage system 104, and a single tape unit 106 are shown, it is understood by one of ordinary skill in the art that the system may be extended to have more than one of one or more of each.

The host 102, the storage system 104, and the tape unit 106 may be coupled using a conventional FICON connection or possibly a network, such as the Internet, a different TCP/IP network, a SAN, a WAN, and/or any other appropriate mechanism for transporting data between the host 102 and the storage system 104 and between the storage system 104 and the tape unit 106. Data connections between the components may be synchronous or asynchronous (or possibly a combination thereof). In some embodiments, the host 102 may be coupled directly to the tape unit 106 (shown in FIG. 1 as a dashed line) to provide an alternative, conventional, data transfer mechanism between the host 102 and the tape unit 106 so that, for example, specific data may be transferred from the storage system 104 to the tape unit 106 and then subsequently read directly from the tape unit 106 by the host 102, or vice versa.

Figure 2:
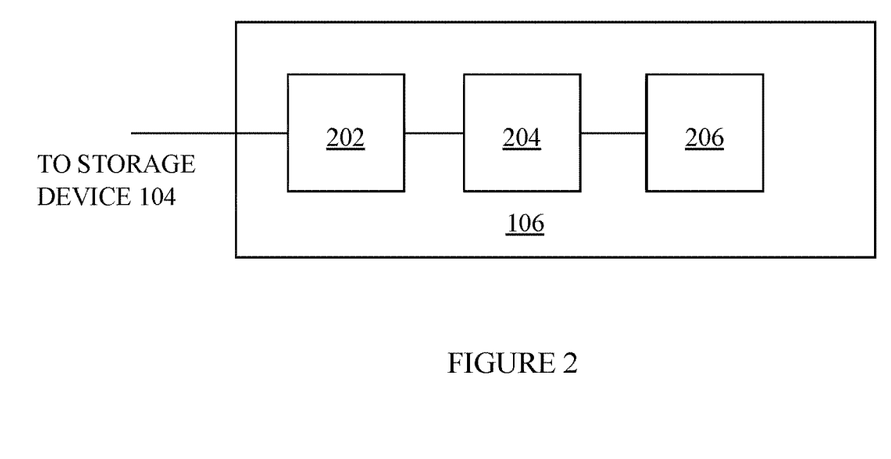
FIG. 2 is a schematic diagram illustrating a tape emulation device according to an embodiment of the system described herein.

Referring to FIG. 2, the tape unit 106 is shown in more detail as a tape emulation unit that includes a front end component 202, a data mover/server 204, and a storage system 206 coupled thereto. The front end component 202 may include a FICON link that may be coupled to the storage system 104 for data communication between the storage system 104 and the tape unit 106. Other types of links may be used. The front end component 202 may include FICON link emulation functionality as well as tape emulation functionality, such as that provided by components of the DLm.

The data mover/server 204 may be coupled to the front end component 202 using, for example, a GigE switch while the storage system 206 is coupled to the data mover/server 204 using any appropriate protocol, such as Fibre Channel. The data mover/server 204 may be accessed by the front end component 202 using any appropriate protocol, such as NFS (Network File System). In an embodiment herein, the data mover/server 204 may include an NFS server, such as a Celerra data mover, and the storage system 206 may be a Data Domain or Symmetrix data storage array. There may be other components used instead of, and/or in addition to, the NFS server and the data storage array.

Conventionally, a tape storage device or tape emulation device, such as the tape unit 106, is coupled to and communicates directly with a host, such as the host 102. Applications running on the host 102 execute conventional tape operations, such as mounting tapes, exchanging data with tapes (reading and writing), providing media changer commands, receiving media changer information (e.g., bar code information), etc. However, in the system described herein, the storage system 104 is coupled directly to the tape unit 106. The storage system 104 is configured to act as a host with respect to the connection between the storage system 104 and the tape unit 106. In an embodiment herein, the storage system 104 and the tape unit 106 are coupled using a conventional FICON channel/protocol so that the storage system 104 acts as a FICON initiator to the tape unit 106. If the FICON channel at the storage system 104 supports the IBM 3590 protocol, then the tape unit 106 could be a Dell/EMC DLm virtual tape unit. Of course, any other type of tape unit may be used, including an actual tape drive and it is also possible to use any type of out-of-band (OOB) storage.

In the system described herein, the host 102 sends metadata information to the storage system 104 to direct the storage system 104 to exchange data with the tape unit 106. Thus, relatively large amounts of data may be exchanged between the storage system 104 and the tape unit 106 without transferring any data through the host 102. Moreover, unlike solutions described in U.S. Pat. No. 9,645,766 titled "TAPE EMULATION ALTERNATE DATA PATH" to Douglas E. LeCrone, which is incorporated by reference herein, the system described herein does not require that the tape unit 106 be modified from an off-the-shelf configuration since the storage system 104 emulates a host when coupled to the tape unit 106. In an embodiment herein, the host 102 provides metadata to the storage system 104 using any appropriate format that can be detected and interpreted by the storage system 104.

Figure 3:
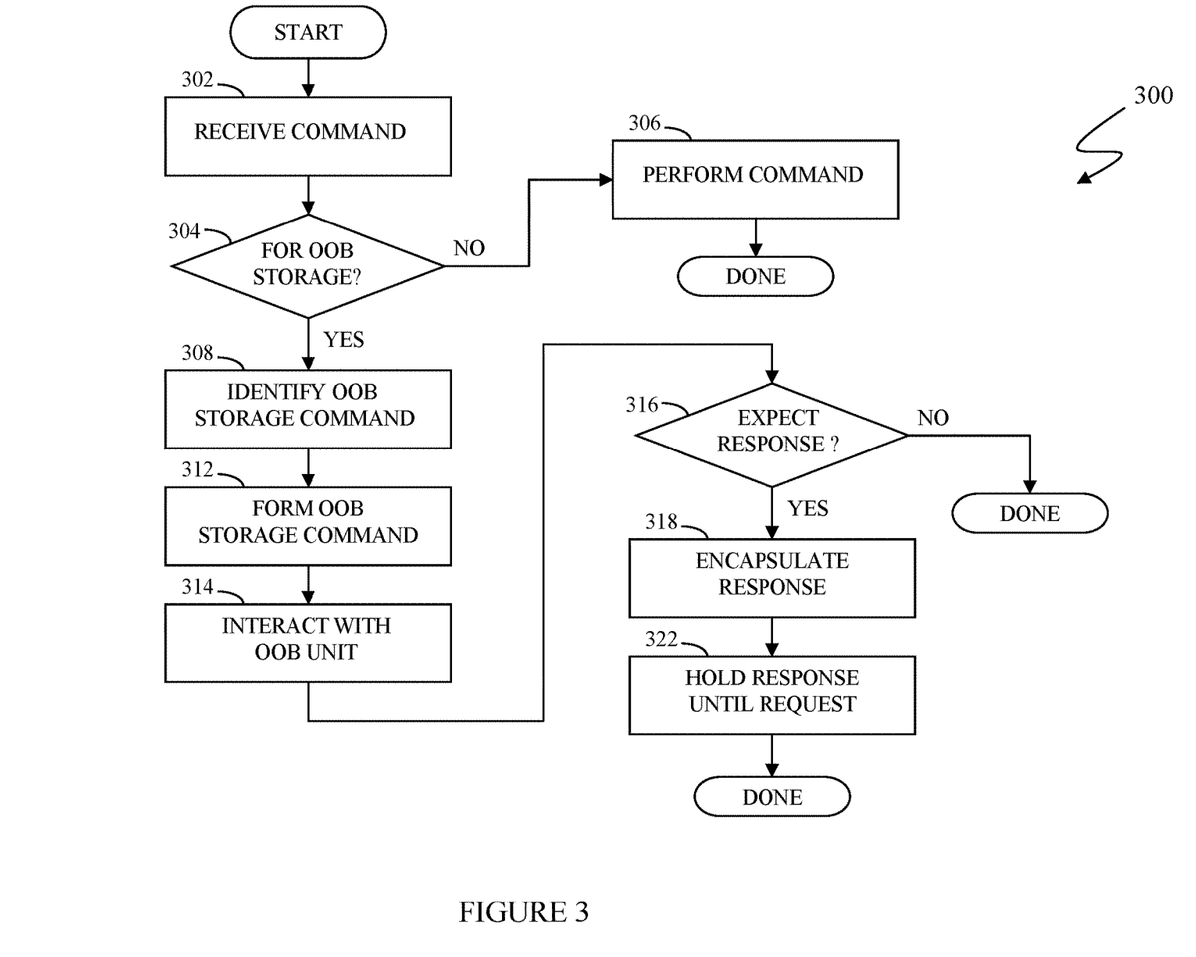
FIG. 3 is a flow diagram illustrating processing performed at a storage system to handle metadata received from a host and process tape unit commands according to an embodiment of the system described herein.

Referring to FIG. 3, a flow diagram 300 shows processing performed at the storage system 104 in connection with receiving from the host 102 commands that may include metadata for transferring data between the storage system 104 and an out-of-band (OOB) storage device, such as the tape unit 106. The commands may be any type of OOB storage command that are used for operating an OOB storage device, such as a tape drive and possibly also a media changer. The commands may include commands for mounting tapes, exchanging data with tapes (reading and writing), media changer commands, receiving media changer information (e.g., bar code information), etc. Processing begins at a first step 302 where the storage system 104 receives a command from the host 102. Following the step 302 is a test step 304 where it is determined whether the received command is an OOB storage command (i.e., a command relating to an OOB storage device, such as the tape unit 106). The host 102 may identify OOB storage commands by using a flag or other type of marker in the command to indicate to the storage system 104 that the command is an OOB storage command. If it is determined at the step 304 that the received command is not an OOB storage command (i.e., is a conventional storage system operation command), then control transfers from the test step 304 to a step 306 where the command is processed by the storage system in a conventional manner. For example, at the step 306, the storage system 104 may execute a conventional command to transfer data from the storage system 104 to the host 102. Following the step 306, processing is complete.

If it is determined at the test step 304 that the command that has been received is for OOB storage, then control transfers from the test step 304 to a step 308 where the storage system 104 identifies the OOB storage command. The identification may be performed using any appropriate mechanism, such as a conventional lookup table (e.g., code x embedded in the command received by the storage system 104 corresponds to OOB storage command Y). In some embodiments, the code that is embedded in the command to the storage system 104 will be completely independent from the corresponding OOB storage command so that a lookup table is required. In other embodiments, the code that is embedded in the command to the storage system 104 can be used to form the corresponding OOB storage command, such as with a formula or, in some cases, the actual OOB storage command may be embedded. Following the step 308 is a step 312 where the OOB storage command is formed. In an embodiment herein, the OOB storage command may be any conventional tape and/or media changer command, such as mount a tape, read data from the tape unit 106 to the storage system 104, receive media changer information, such as bar code labels, etc. In an embodiment herein, tape-related commands may use any appropriate format.

Following the step 312 is a step 314 where the storage system 104 interacts with the OOB storage device (e.g., the tape unit 106) to perform the OOB storage command. For example, if the OOB storage command calls for transferring data from the storage system 104 to the tape unit 106, then at the step 314 the storage system 104 sends a command to the tape unit 106 to begin receiving data and then the storage system 104 sends the data to the tape unit 106 and then the storage system receives a completion code/status from the tape unit 106. In some cases, when the OOB storage device is a virtual tape unit, like the virtual tape unit 106, the data may be stored using a conventional format such as AWS Virtual Tape format, which allows exiting tape applications to access the data directly from the tape unit 106. Following the step 314 is a test step 316 where it is determined if the host device 102 expects and/or has requested a return status/code or data or some other information. In some instances, the host 102 may return status (e.g., success/fail) or receive requested data (e.g., media changer bar code ID). If it is determined at the step 316 that the host 102 is not to receive any return information, then processing is complete. Otherwise, control passes from the test step 316 to a step 318 where the information to be returned (from the interaction at the step 314) is encapsulated into an appropriate format, such as the format used by the storage system 104 to return information to the host 102. Following the step 318 is a step 322 where the encapsulated information is held at the storage system 104 until the information is requested by the host 102. In other embodiments, the encapsulated information may be sent directly to the host 102 at the step 322 without waiting for any request. Following the step 322, processing is complete.

In some cases, data is transferred between the storage system 104 and the OOB storage, such as the tape unit 106, without making any modifications to the data. In other instances, the data may be logically transformed in connection with any transfer between the storage system 104 and the OOB storage, such as the tape unit 106. The logical transformation may be built-in and automatic or may be provided as part of any OOB storage command.

Note that in the system described above, applications that access the OOB storage, such as the tape unit 106, provide specific OOB storage commands that are embedded in commands to the storage system 104. However, in some instances, it may be impractical to rewrite/modify an application that accesses OOB storage, such as the tape unit 106, in which case the application expects the host 102 to be coupled directly to the tape unit 106. This may be addressed by modifying drivers or similar low level software on the host 102 to simulate attachment to a tape drive or a tape storage emulation device, such as the tape unit 106, so that applications on the host 102 that perform tape and media changer operations do not need to be modified. When drivers or similar low level software is modified on the host 102 to handle tape-related commands, applications on the host 102 may perform tape and media changer operations as if the host were coupled to a tape unit, such as the tape unit 106, while the low level software at the host 102 and software on the storage system 104 cause data to be exchanged between the storage system 104 and the tape unit 106. This is described in more detail elsewhere herein.

Figure 4:
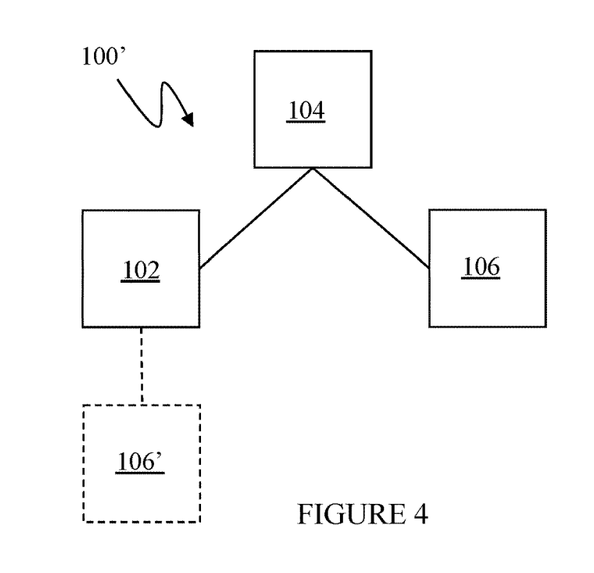
FIG. 4 is a schematic illustration showing a host, a storage system, a tape emulation device, and a phantom tape emulation device according to an embodiment of the system described herein.

Referring to FIG. 4, a diagram 100' shows a system similar to the system shown by the diagram 100 of FIG. 1 that includes the host 102, the storage system 104, and the tape unit 106. The diagram 100' also shows a phantom tape unit 106' coupled to the host 102. The phantom tape unit 106' is not an actual tape unit or tape emulation unit, but instead represents driver software and other low level software on the host 102 that presents applications on the host 102 with what appears to the applications to be a tape unit or tape emulation unit, like the tape unit 106. Thus, for example, an application would perform a read operation to read data on the phantom tape unit 106' and would be returned data from the tape unit 106 through the storage system 104, as described in more detail elsewhere herein.

Figure 5:
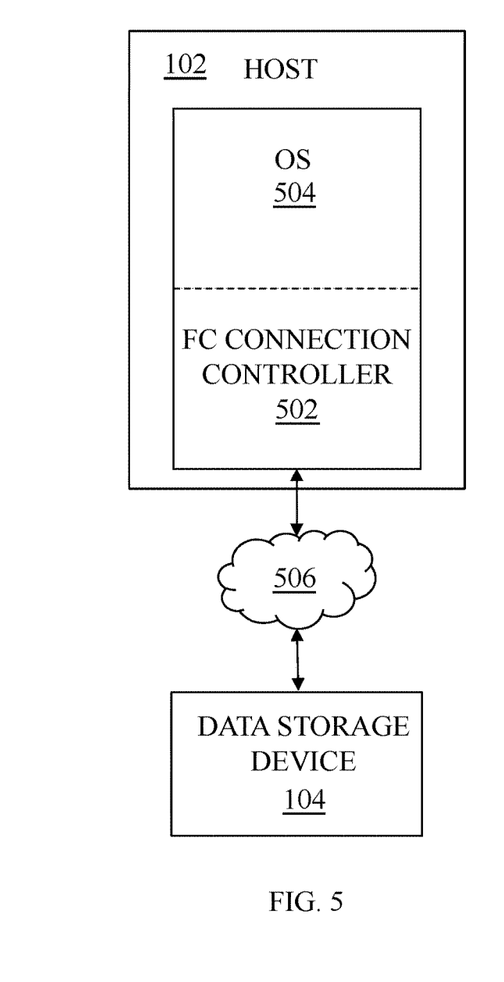
FIG. 5 is a schematic illustration showing a system with a FICON connection between a host and a data storage system according to an embodiment of the system described herein.

FIG. 5 is a schematic illustration showing the host 102 with a FICON connection controller 502 for providing a FICON connection between the host 102 and the data storage system 104 according to an embodiment of the system described herein. The host 102 may be a computer running Linux or some other appropriate operating system 504. I/O processing on the host 102 may operate with the FICON connection controller 502 to enable I/O operations with the data storage system 104. The FICON connection controller 502 may send and receive data to and from the data storage system 104 using a remote connection mechanism 506 that may include a network (such as the Internet, and appropriate connection thereof). The data storage system 104 may include physical storage volumes and/or logical volumes, such as EMC Corporation's Symmetrix data storage facility. The FICON connection controller 502 may act as an I/O subsystem providing FICON communication capability. The data storage system 104 may include features and/or components enabling FICON channel communication with the host 102. For a discussion of features and implementations of FICON systems and suitable channel protocols operating therewith on z/Architecture computing systems, reference is made to J. Entwistle, "IBM System z10 FICON Express8 FCP Channel Performance Report," Technical paper, August 2009, 27 pp., which is incorporated herein by reference.

It is noted that various components of the system may be emulated. For further discussion of emulation of I/O computing components, particular Fibre Channel/FICON connection components, reference is made to U.S. Pat. No. 9,665,502 to Jones et al., issued May 30, 2017, entitled "Virtual I/O Hardware" and to U.S. Pat. No. 9,170,904 to LeCrone et al., issued Oct. 27, 2015, entitled "I/O Fault Injection Using Simulated Computing Environments," which are both incorporated herein by reference. Accordingly, in various embodiments, the system described herein provides for use of a channel emulator to emulate data transfer paths in I/O operations, and in which the channel emulator may simulate a host channel to provide I/O connectivity with an I/O device and may provide for the I/O connectivity using different channel protocols.

The connection mechanism 506 may include an Internet connection and/or possibly some other types of connection(s). In an embodiment herein, the connection mechanism 506 may be directly incompatible with a FICON connection. The incompatibility may be hardware incompatibility, software incompatibility, or both. Such connection mechanism 506 may not support a direct FICON connection but, instead, rely on a FICON emulator (and/or other emulator(s)) for providing data in an appropriate format. It is further noted that where FICON emulation is being performed, the data storage system 104 may include or be coupled to a FICON emulator portion that may send and receive data to and from the connection mechanism 506 and also emulates a Fibre Channel FCO physical layer for the benefit of the data storage system 104. Thus, in such a case involving emulation, both the host 102 and the data storage system 104 may operate as if the devices 102, 104 were communicating using a FICON hardware connection.

In an embodiment, the system described herein may be used with IBM's z High Performance FICON (zHPF) transport mode protocol implementation. zHPF enhances z/Architecture and FICON interface architecture to improve data transfer processing. In z/OS, standard FICON architecture operates with the command mode protocol, and a zHPF architecture operates with the transport mode protocol. zHPF provides a Transport Control Word (TCW) that facilitates the processing of an I/O request by the channel and the controller. The TCW enables multiple channel commands to be sent to the controller as a single entity (instead of being sent as separate commands as in a FICON channel command word (CCW)). The channel no longer has to process and keep track of each individual CCW. The channel forwards a chain of commands to the controller for execution. zHPF capable channels may support both FICON and zHPF protocols simultaneously. For a more detailed discussion of zHPF, reference is made, for example, to C. Cronin, "IBM System z10 I/O and High Performance FICON for System z Channel Performance," Technical paper, IBM Corporation, Jan. 28, 2009, 33 pp., which is incorporated herein by reference.

Figure 6:
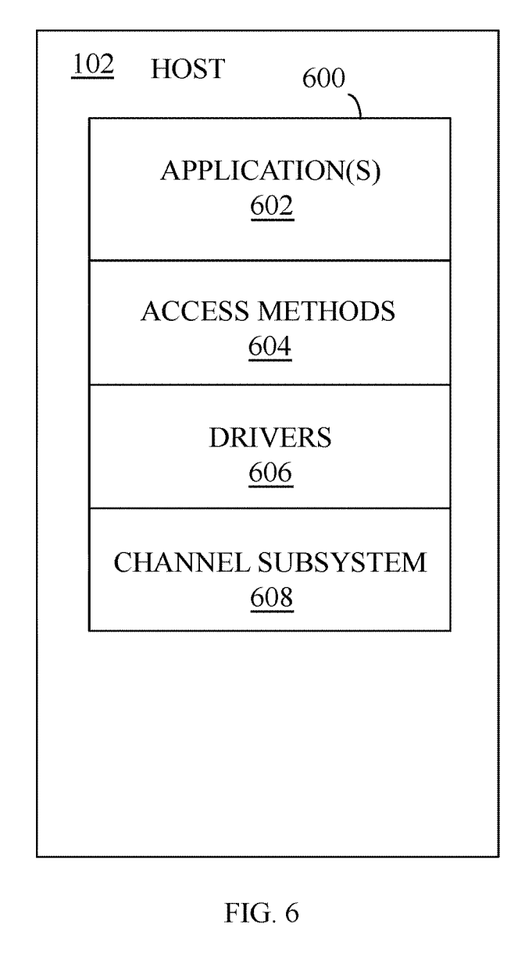
FIG. 6 is a schematic illustration showing software layers in a host according to an embodiment of the system described herein.

Referring to FIG. 6, the host 102 is illustrated with software 600 having an application(s) layer 602, an access methods layer 604, a drivers layer 606, and a channel subsystem layer 608. The application(s) layer 602 includes one or more software applications that run on the host 102. The access methods layer 604 includes I/O routines (e.g., read, write, open, etc.) that are used by applications in the application(s) layer 602 in connection with performing I/O operations. Software in the application(s) layer 602 calls specific routines in the access methods layer 604 to access data on a storage system coupled to the host.

The I/O routines in the access methods layer 604 call driver routines in the drivers layer 606 that perform lower-level device specific operations that depend upon the specific type of I/O device and the type of connection thereto. For example, a first driver for a Symmetrix storage system coupled to the host 102 by a FICON connection may be different than a second driver used for a different type of non-volatile storage system coupled to the host 102 using a different type of connection. Note, however, that an application in the application layer 602 may call the same routine (e.g., read) in the access layer 604 irrespective of the physical hardware (and connection there) used for the data, but that the routine in the access layer 604 that is called may call different routines in the drivers layer 606, depending upon a specific configuration/hardware of the system.

The channel subsystem layer 608 includes routines that control the hardware used for I/O operations, including any storage systems and channels used for transferring data between the host 102 and the storage system 104. Routines in the drivers layer 606 call routines in the channel subsystem layer 608 to perform hardware operations and to transfer data to and from the host 102 and to exchange status and control information to facilitate control of the I/O hardware.

In an embodiment herein, routines in the drivers layer 606 that relate to accessing a tape unit are modified to provide appropriate commands to the storage system 104 to provide interaction between the storage system 104 and the tape unit. Thus, when an application in the applications layer 602 performs a tape-related command (e.g., attach tape unit), the application calls a routine in the access methods layer 604 that calls an appropriate driver in the drivers layer 606. However, although the driver in the drivers layer 606 is presented to the routine in the access methods layer 604 as a conventional tape unit driver, the driver will not directly perform tape unit operations but will, instead, provide a command to the storage unit 104 that indicates a tape-related command that is to be pass on to the tape unit 106, as described elsewhere herein (see, for example, FIG. 3 and the related text). This is described in more detail elsewhere herein.

Figure 7:
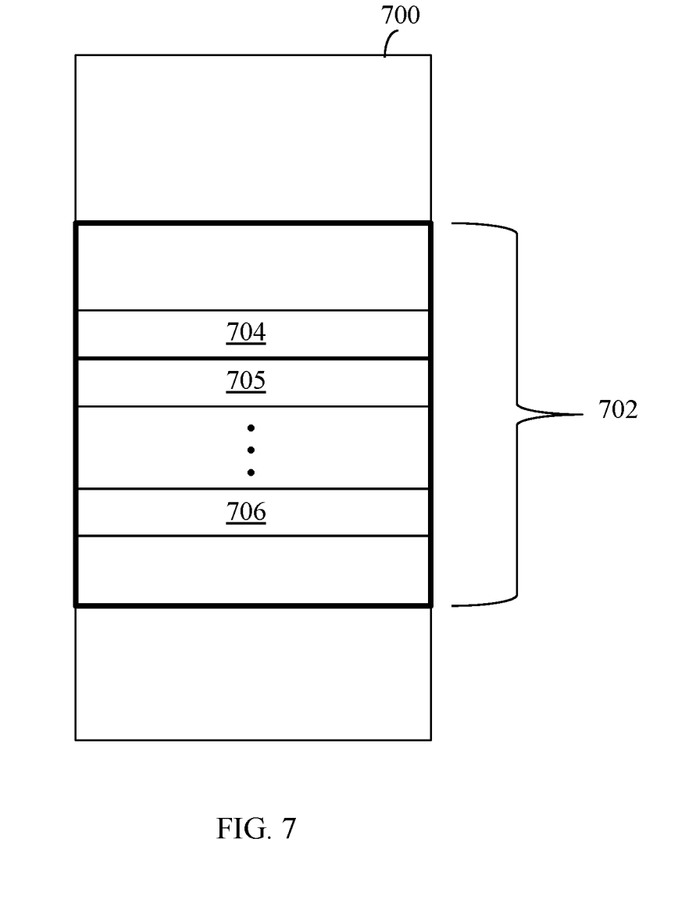
FIG. 7 is a diagram illustrating a UCB accessing a first physical storage space according to an embodiment of the system described herein.

Referring to FIG. 7, a memory space 700 of a host computer (e.g., the host 102) includes a common area 702 that may be accessed by different application running on the host computer 102. In an embodiment herein, more than one of the applications of the host computer may access that same portion(s) of the common area 702, although in some embodiments, there may be restrictions on multiple applications accessing the same memory space for writing at the same time and/or restrictions on simultaneous reading and writing.

In an embodiment herein, the host computer may be an IBM system running the MVS or z/OS operating system, although the system described herein may be implemented using any appropriate operating system. The common area 702 may include a plurality of UCBs (Unit Control Blocks) 704-706, which provide metadata for applications to access logical devices. In some cases (e.g., storage systems, tape devices), the UCB provides information that is used in connection with accessing physical volume space corresponding to logical volume space of the UCB. An application accessing a tape device may access an appropriate one (or more) of the UCBs 704-706 corresponding to one or more logical devices, including tape emulation devices.

In the embodiment illustrated in FIG. 4, applications running on the host 102 perform tape-related operations such as mount tape, read tape, access a media changer, get bar code information from the media changer, etc. However, rather than accessing any tape drive or tape emulation unit, the applications are accessing the phantom tape drive 106', which is created by modifying the drivers 606 to cause tape-related commands to be transferred from the host 102 to the storage system 104 that send tape-related commands to the tape unit 106. Similarly, applications running on the host 102 receive tape-related status information that is transferred from the tape unit 106 to the storage system 104 and then to the host 102 even though it appears to the applications that the status information was received from the phantom tape drive 106'. The applications in the applications layer 602 may have no information regarding the actual path of the data and operate as if the phantom tape drive 106' were an actual tape unit were coupled directly to the host 102.

Note that, since applications in the applications layer 602 expect that the host 102 is coupled directly to a tape unit (e.g., the phantom tape unit 106'), then there may be instances where the applications expect to read data into the host 102 or write data from the host 102. Of course, if an application expects the host 102 to manipulate tape data, then the data needs to be transferred to the host 102. However, in the case of data transfer operations that transfer data between the storage system and the tape unit 106, the appropriate driver in the drivers layer 606 may formulate a tape-related command that allows the data to be transferred without the data needing to be provided to the host 102. For example, a first command in an application to read specific data from the tape unit 106 and an adjacent command to write the same data to the storage unit 104 may be converted by the driver into a single tape-related command to transfer the data from the tape unit 106 to the storage system 104 so that the data is never received by the host 102. In some cases, if an application modifies tape data, then the data may be transferred to the host 102 even though the data is also being transferred between the storage system 104 and the tape unit 106. However, it may also be possible to forgo transferring modified data to the host 102 if the data may be logically transformed in connection with the moving the data between the storage system 104 and the tape unit 106, as described elsewhere herein. The logical transformation may be built-in and automatic or may be provided as part of any transfer command.

Figure 8:
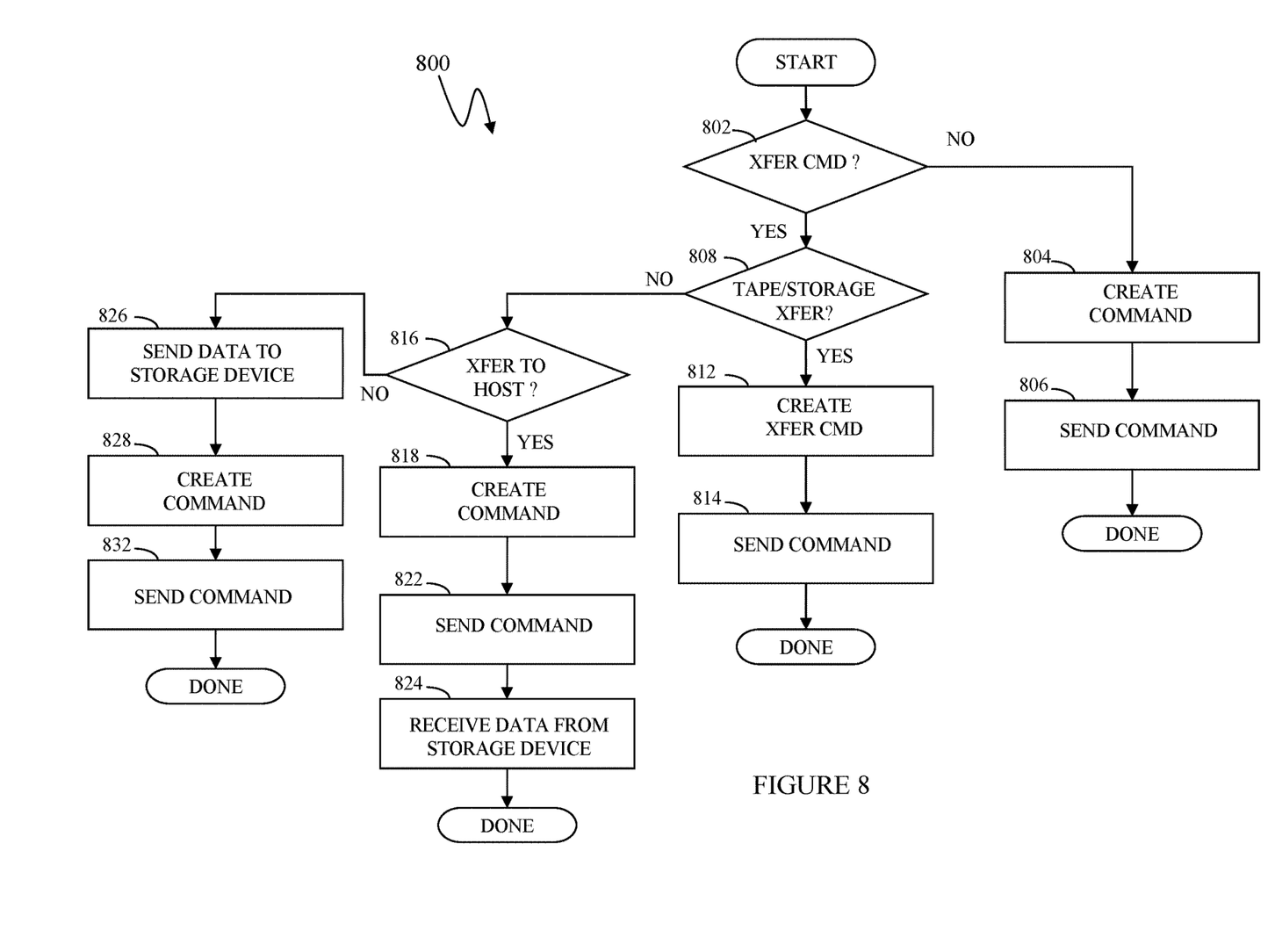
FIG. 8 is a flow diagram illustrating processing performed at a host to handle transferring commands to a storage system according to an embodiment of the system described herein.

Referring to FIG. 8, a flow diagram 800 illustrates steps performed by a driver in the drivers layer 606 of the host 102 handling a tape-related command generated in connection with an application running in the applications layer 602 of the host 102. Processing begins at a first step 802 where it is determined if the tape-related command involves transferring data (e.g., read or write) or not (e.g., mount tape drive). If it is determined at the step 802 that the tape-related command does not involve transferring data, then control transfers from the test step 802 to a step 804 where the driver creates the command for the storage system 104 which will result in the storage system 104 interacting with the tape unit 106, as described elsewhere herein. Following the step 804 is a step 806 where the command is sent to the storage system by the driver through the channel subsystem 608 to the storage system 104. Following the step 806, processing is complete.

If it is determined at the test step 802 that the tape-related command involves transferring data, then control transfers from the test step 802 to a test step 808 where it is determined if the tape-related transfer command transfers data between the storage system 104 and the tape unit 106. Note that it is possible to have more than one tape-related command that transfers data between the storage system 104 and the tape unit 106. For example, a first command could read data from the tape unit 106 and a second command could write the same data back to the storage system 104. If it is determined at the test step 808 that the tape-related transfer command transfers data between the storage system 104 and the tape unit 106, then control transfers from the test step 808 to a step 812 where the driver creates the transfer command for the storage system 104 which will result in the storage system 104 interacting with the tape unit 106, as described elsewhere herein, to transfer data between the storage system 104 and the tape unit 106. Following the step 812 is a step 814 where the command is sent to the storage system 104 by the driver through the channel subsystem 608 to the storage system 104. Following the step 814, processing is complete.

If it is determined at the test step 808 that the tape-related transfer command does not transfer data between the storage system 104 and the tape unit 106 (and thus transfers data to or from the host 102), then control transfers from the test step 808 to a test step 816 where it is determined if data is being transferred from the tape unit 106 to the host 102. If so, then control transfers from the test step 816 to a step 818 where the driver creates the transfer command for the storage system 104 which will result in the storage system 104 interacting with the tape unit 106, as described elsewhere herein, to transfer data from the tape unit 106 to the storage system 104. Following the step 818 is a step 822 where the command is sent to the storage system 104 by the driver through the channel subsystem 608 to the storage system 104. Following the step 822 is a step 824 where the host 102 receives the data from the storage system 104 (see, for example, the steps 316, 318, 322 of the flow diagram 300, discussed above). Following the step 824, processing is complete.

If it is determined at the test step 816 that data is not being transferred from the tape unit 106 to the host 102 (and thus is being transferred from the host 102 to the tape unit 106), then control transfers from the test step 816 to a step 826 where the host transfers the data to the storage system 104. Following the step 826 is a step 828 where the driver creates a transfer command for the storage system 104 which will result in the storage system 104 interacting with the tape unit 106, as described elsewhere herein, to transfer the data from the storage system 104 to the tape unit 106. Following the step 828 is a step 832 where the command is sent to the storage system 104 by the driver through the channel subsystem 608 to the storage system 104. Following the step 832, processing is complete.

In some cases, it is desirable to be able to transfer data from a storage system to a cloud storage and/or some other type of archive storage. The transfers are more efficient if the host does not need to receive or send any data in connection with these transfers so that the data is transferred directly between the storage system and the cloud/archive storage. That is, a direct transfer between a storage system and the cloud/archive storage is more efficient than having the host read data from either the storage system or the cloud/archive storage and writing the data back out to the other one of the storage system or the cloud/archive storage. In some cases, the storage system may have a built in mechanism for directly transferring data between the storage system and the cloud/archive storage where the built in mechanism may be accessed by the host. For example, the host sends a command to the storage system to cause the storage system to transfer particular blocks of the storage system to particular locations in a cloud storage area. However, for systems where the storage system is not configured to access cloud storage directly, it can be a challenge to handle commands from a host to transfer data between the storage system and cloud/archive storage.

Figure 9:
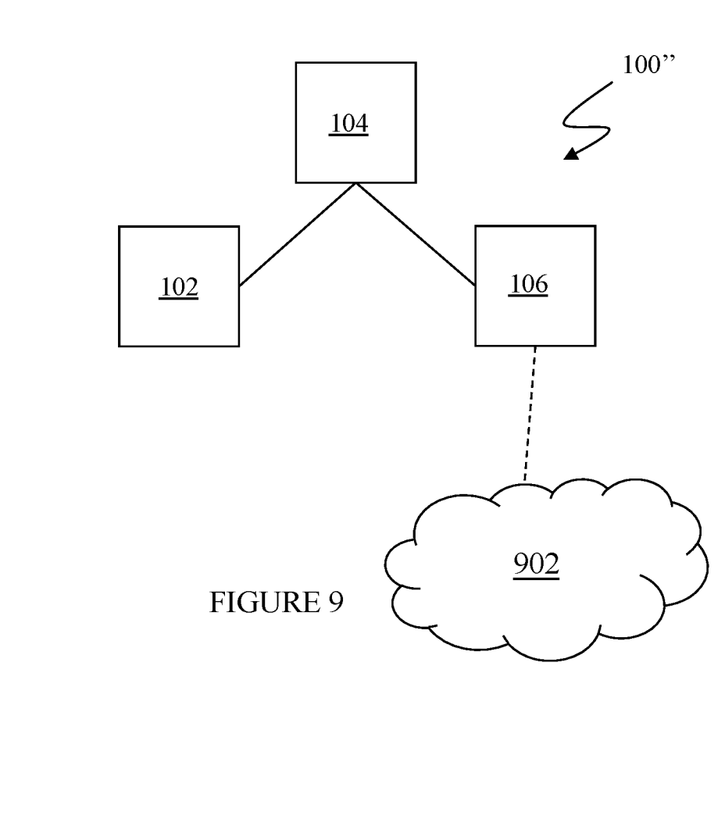
FIG. 9 is a schematic illustration showing a host, a storage system, a tape emulation device, and a cloud storage according to an embodiment of the system described herein.

Referring to FIG. 9, a diagram 100" illustrates an embodiment that includes the host 102, the storage system 104, and the tape unit 106. The tape unit 106 may be coupled to a cloud storage 902, which exchanges data with the tape unit 106. In other embodiments, the cloud storage 902 may be replaced with other types of archive storage, including a disk array storage, another tape unit, etc. As explained in more detail elsewhere herein, the storage system 104 receives commands from the host 102 to transfer data on the storage system 104 to cloud storage or vice versa. In response thereto, the storage system exchanges data with the tape unit 106 which may then, optionally, exchange data with the cloud storage 902.

Figure 10:
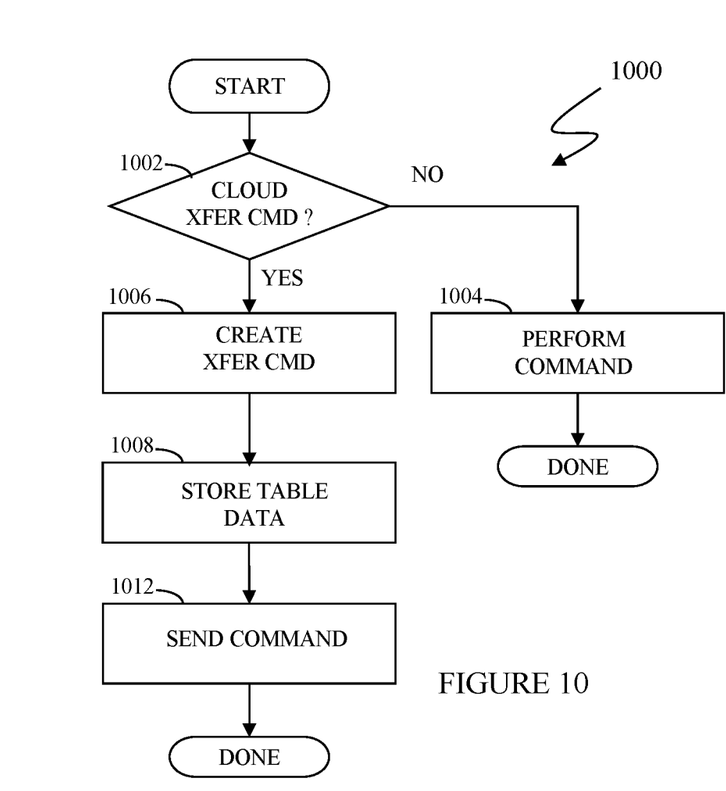
FIG. 10 is a flow diagram illustrating processing performed at a host to handle cloud transfer commands according to an embodiment of the system described herein.

Referring to FIG. 10, a flow diagram 1000 illustrates steps performed by a driver in the drivers layer 606 of the host 102 handling data I/O operations generated in connection with an application running in the applications layer 602 of the host 102. Some of the I/O operations may correspond to commands to transfer data between the storage system 104 and cloud storage. Processing begins at a first step 1002 where it is determined if the I/O operation involves exchanging data between the storage system 104 and cloud storage. If not, then control transfers from the test step 1002 to a step 1004 where the driver performs a conventional I/O operation, such as transferring data from the host 102 to the storage system 104. Following the step 1004, processing is complete.

If it is determined at the test step 1002 that the I/O operation involves exchanging data between the storage system 104 and cloud storage, then control passes from the test step 1002 to a step 1006 where a command is created to cause the storage system 104 to transfer data to the tape unit 106 or vice versa. An example of an I/O operation that involves exchanging data between the storage system 104 and cloud storage is an I/O operation that instructs the storage system 104 to migrate identified data on the storage system 104 to cloud storage. Creating a command to transfer data between the storage system 104 and the tape unit 106 is described in more detail elsewhere herein. Following the step 1006 is a step 1008 where a table that contains a mapping between data on the tape unit 106 and data the host reads or writes to cloud storage is updated. In an embodiment herein, a table is maintained that maps cloud storage locations (e.g., cloud provider, bucket ID, etc.) to tape unit locations (e.g., tape volume identifier, file name, position, etc.). In an embodiment herein, the table is stored on the host 102 and may be maintained by the drivers in the drivers layer 606 and/or as part of a table management system. An advantage of maintaining the table at the host 102 is that the storage system 104 does not require modifications to handle the mapping. In other embodiments, the table may be maintained at the storage system 104, which receives relevant information by having the command created at the step 1006 include cloud access information (cloud provider, bucket ID, etc.) in the command. An advantage of maintaining the table at the storage system 104 is that other hosts may access the data based on the cloud access information, which may be translated by the storage system 104 into tape unit locations (e.g., tape volume identifier, file name, position, etc.) using the table. Following the step 1008 is a step 1012 where the command is sent to the storage system 104 by the driver through the channel subsystem 608 to the storage system 104. Following the step 1012, processing is complete.

In some embodiments, data is compressed and/or encrypted prior to being transferred from the storage system 104 to the tape unit 106. In some embodiments, the system may virtualize an out-of-band connection between the host 102 and cloud storage that provides control data from the host 102 to the cloud storage. Commands that an application on the host 102 attempts to communicate out-of-band with cloud storage may be intercepted by a driver in the drivers layer 606 and simulated by being transferred through the storage system 104, as described elsewhere herein. In instances where the tape unit 106 is a virtual tape unit, such as the DLm device, it may be possible to take advantage of data handling features such as data deduplication and snap copy.

In some cases, it may be desirable to use the system described herein to directly backup logical data (e.g., files) provided on the storage system 104. In an embodiment herein, the storage system 104 accesses metadata to determine logical file structures and backs up files directly to backup storage, such as the tape emulation unit 106 and/or the cloud storage 902, without any involvement by the host 102. The storage system 104 may use machine learning to determine which of the files is to be backed up and when the backup needs to occur.

Figure 11:
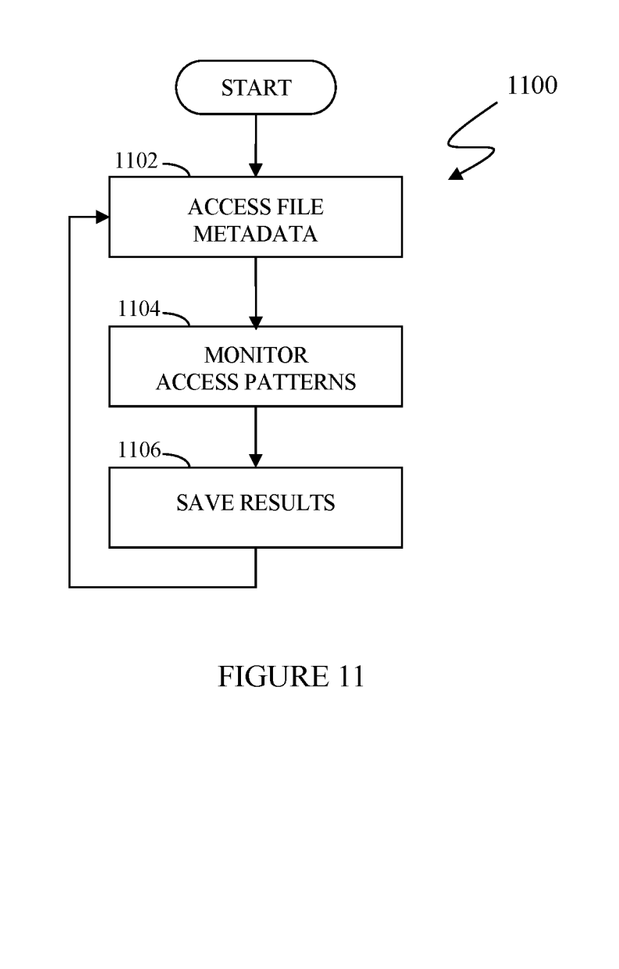
FIG. 11 is a flow diagram illustrating processing performed in connection with a storage system acquiring data used to logically back up data from a storage system to a tape unit according to an embodiment of the system described herein.

Referring to FIG. 11, a flow diagram 1100 illustrates processing performed by the storage system 104 in connection with obtaining data that may subsequently be used in connection with performing logical backups of files from the storage system 104 directly to a backup storage system, such as the tape unit 106, the cloud storage 902, or some other type of backup storage. In some embodiments, the host 102 (or similar) may initiate processing on the storage system 104, but in other embodiments processing is performed on the storage system 104 without any input or initiation from the host 102. Processing begins at a first step 1102 where the storage system 104 determined file system information for logical files stored at the storage system 104. In an embodiment herein, all metadata necessary to determine logical files is stored on the storage system 104. For example, if the host 102 is an IBM System z device, file metadata is stored in known structures, including one or more of a VTOC (volume table of contents), an IXVTOC (indexed VTOC), VSAM (virtual storage access method) information, a VVDS (VSAM volume data set), catalog data, etc. Determining which blocks of the storage system 104 correspond to particular files is straightforward when the metadata that supports file structures is known and accessible.

Following the step 1102 is a step 1104 where the storage system 104 monitors file access patterns by the host 102 prior to performing a subsequent direct backup to backup storage. The system may use machine learning to analyze observations and determine the files that are contained on the storage system 104 so that the system may subsequently perform logical backups directly to a backup storage with little to no involvement of the host 102. Machine learning facilitates determination of file access patterns to identify which files have been updated and a frequency of backups used to protect data. The machine learning may be conventional machine learning that receives as input file access patterns and related information and determines and possibly predicts file access patterns based on the input. The storage system 104 uses system file metadata information to logically validate files for structural integrity and to backup files, or possibly backup only changed tracks of files. In some embodiments, a cooperative application on the host 102 could help orchestrate the direct backup of data from the storage system 104, especially in the case of multivolume, multi-storage controller files. Note that file attributes, including management class information (i.e., number of backups, frequency of backups, backup priority, backup retention policy, etc.), may be read directly from an SMS (system managed storage) management class definition, which is stored on the storage system 104.

Following the step 1104 is a step 1106 where the information obtained at the steps 1102, 1104 as well as any machine learning results are stored for future use by processing that backs up data directly from the storage system 104 to a backup storage system. Following the step 1106, control transfers back to the step 1102, described above, for another iteration. Note that, in some embodiments, the processing illustrated by the flow diagram 1100 may be performed only prior to directly backing up data from the storage system 104 to backup storage. In other embodiments, the processing illustrated by the flow diagram 1100 may be performed continuously both prior to and after directly backing up data from the storage system 104 to backup storage and may even be performed independently while other processes are backing up data from the storage system 104 to backup storage.

Figure 12:
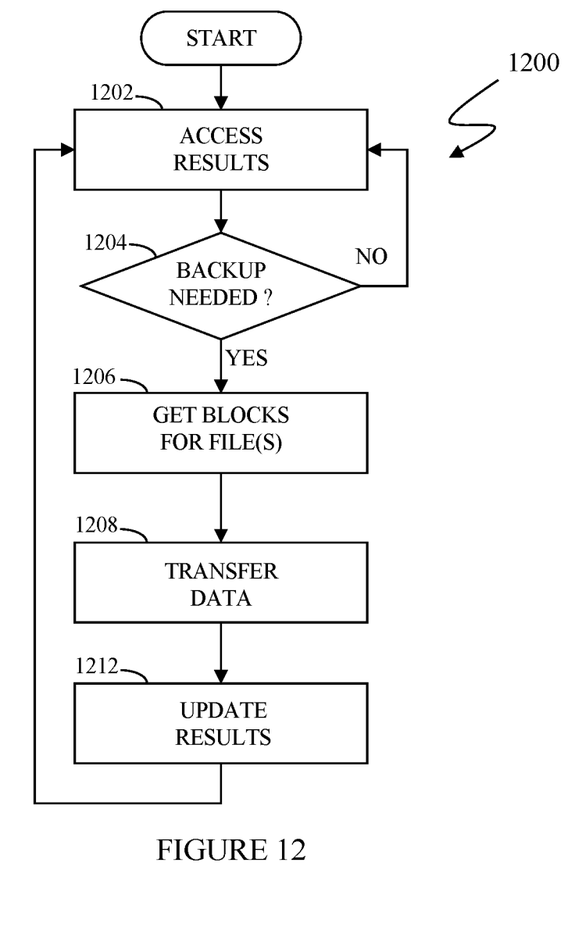
FIG. 12 is a flow diagram illustrating processing performed in connection with directly transferring logical data from a storage system to a tape unit according to an embodiment of the system described herein.

Referring to FIG. 12, a flow diagram 1200 illustrates processing performed by the storage system 104 in connection with directly backing up files from the storage system 104 to backup storage, such as the tape emulation unit 106 or the cloud storage 902. In some embodiments, the host 102 (or similar) may initiate processing on the storage system 104, but in other embodiments processing is performed on the storage system 104 without any input or initiation from the host 102. Processing begins at a first step 1202 where the information and machine learning results obtained by the processing illustrated by the flow diagram 1100, described elsewhere herein, is accessed. Following the step 1202 is a test step 1204 where it is determined if a backup of one or more files needs to be performed. The determination at the test step 1204 examines the information obtained by the processing illustrated by the flow diagram 1100, including files to be backed up, backup frequencies and times, etc., to determine if one or more file backups are to be performed. If not, then control transfers back to the step 1202 to examine the information and machine learning results. The steps 1202, 1204 are essentially a polling loop that loops until it is time to back up at least one file.

If it is determined at the test step 1204 that one or more file backups are to be performed, then control transfers from the test step 1204 to a step 1206 where the blocks corresponding to files to be backed up, along with the ordering of the blocks, are obtained from the information and machine learning results obtained by the processing illustrated by the flow diagram 1100. Following the step 1206 is a step 1208 where the data corresponding to the blocks obtained at the step 1206 is transferred from the storage system 104 to the backup storage. Note that the backup storage may be coupled to the storage system 104 using a relatively fast communication mechanism, such as Fibre Channel or possibly zHyperlink. Following the step 1208 is a step 1212 where the information and machine learning results obtained by the processing illustrated by the flow diagram 1100 is updated to reflect the backup operations performed at the step 1208. Following the step 1212, control transfers back to the step 1202, discussed above, for another iteration.

Various embodiments discussed herein may be combined with each other in appropriate combinations in connection with the system described herein. The system described herein may be implemented using the hardware described herein, variations thereof, or any other appropriate hardware capable of providing the functionality described herein. Thus, for example, one or more storage systems having components as described herein may, alone or in combination with other devices, provide an appropriate platform that executes any of the steps described herein.

In some instances, the order of steps in the flow diagrams, flow diagrams and/or described flow processing may be modified, where appropriate. Further, various aspects of the system described herein may be implemented using software, hardware, a combination of software and hardware and/or other modules or devices having the described features and performing the described functions. Software implementations of the system described herein may include executable code that is stored in a non-volatile computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate tangible storage medium or computer memory on which executable code may be stored and executed by a processor. The system described herein may be used in connection with any appropriate operating system.

While the invention has been disclosed in connection with various embodiments, modifications thereon will be readily apparent to those skilled in the art. Accordingly, the spirit and scope of the invention is set forth in the following claims.

What is claimed is:

1. A method of transferring data from a storage system to a backup system that is coupled directly to and communicates with the storage system, comprising:
the storage system accessing file metadata stored thereon by a host system that writes logical data to the storage system, wherein the host system is coupled to the storage system and is separate from the backup system and the storage system and wherein the file metadata corresponds to the logical data and wherein the file metadata includes at least one of: a VTOC (volume table of contents), an IXVTOC (indexed VTOC), VSAM (virtual storage access method) information, and a VVDS (VSAM volume data set);
the storage system using at least one of the VTOC, the IXVTOC, the VSAM, and/or the VVDS of the file metadata to determine logical file structures of data stored on the storage system by the host system;
the storage system using machine learning running exclusively on the storage system to ascertain file access patterns of the logical file structure that is stored on the storage system by the host and to ascertain frequency of file backups;
the storage system determining portions of the logical data based on the logical file structure of data stored on the storage system and the file access patterns and frequency of file backups; and
the storage system directly transferring only the portions of the logical data based on the logical file structures from the storage system to the backup system.

2. The method, according to claim 1, wherein the file metadata also includes file attributes that provide management class information for each of the files.

3. The method, according to claim 2, wherein the management class information includes data indicating number of backups, frequency of backups, backup priority, and backup retention policy.

4. The method, according to claim 3, wherein the management class information is read directly from an SMS (system managed storage) management class definition.

5. The method, according to claim 4, wherein the SMS management class definition is stored on the storage system.

6. The method, according to claim 1, wherein backing up logical data from the storage system to the backup system is initiated by a host computing system coupled to the storage system.

7. The method, according to claim 1, wherein the backup system is a tape unit.

8. The method, according to claim 7, wherein the tape unit is a tape emulation unit.

9. A non-transitory computer readable medium containing software that transfers data from a storage system to a backup system that is coupled directly to and communicates with the storage system, the software comprising:
executable code that causes the storage system to access file metadata stored thereon by a host system that writes logical data to the storage system, wherein the host system is coupled to the storage system and is separate from the backup system and the storage system and wherein the file metadata corresponds to the logical data and wherein the file metadata includes at least one of: a VTOC (volume table of contents), an IXVTOC (indexed VTOC), VSAM (virtual storage access method) information, and a VVDS (VSAM volume data set);
executable code that causes the storage system to use at least one of the VTOC, the IXVTOC, the VSAM, and/or the VVDS of the file metadata to determine logical file structures of data stored on the storage system by the host system;
executable code running exclusively on the storage system that uses machine learning to ascertain file access patterns of the logical file structure that is stored on the storage system by the host and to ascertain frequency of file backups;
executable code that causes the storage system to determine portions of the logical data based on the logical file structure of data stored on the storage system and the file access patterns and frequency of file backups; and
executable code that causes the storage system to directly transfer only the portions of the logical data based on the logical file structures from the storage system to the backup system.

10. The non-transitory computer readable medium, according to claim 9, wherein the file metadata also includes file attributes that provide management class information for each of the files.

11. The non-transitory computer readable medium, according to claim 10, wherein the management class information includes data indicating number of backups, frequency of backups, and backup priority.

12. The non-transitory computer readable medium, according to claim 11, wherein the management class information is read directly from an SMS (system managed storage) management class definition.

13. The non-transitory computer readable medium, according to claim 12, wherein the SMS management class definition is stored on the storage system.

14. The non-transitory computer readable medium, according to claim 9, wherein backing up logical data from the storage system to the backup system is initiated by a host computing system coupled to the storage system.

15. The non-transitory computer readable medium, according to claim 9, wherein the backup system is a tape unit.

16. The non-transitory computer readable medium, according to claim 15, wherein the tape unit is a tape emulation unit.

17. A logical backup system, comprising:
a storage system having one or more processors and a non-transitory computer readable storage medium coupled thereto, the non-transitory computer readable storage medium containing software that is executed by the one or more processors;
a host coupled directly to the storage system that writes file metadata and logical data to the storage system, wherein the file metadata corresponds to the logical data and wherein the file metadata includes at least one of: a VTOC (volume table of contents), an IXVTOC (indexed VTOC), VSAM (virtual storage access method) information, and a VVDS (VSAM volume data set; and
a backup system coupled directly to the storage system, wherein the software of the storage system includes executable code that accesses file metadata stored thereon by the host system, executable code that uses at least one of the VTOC, the IXVTOC, the VSAM, and/or the VVDS of the file metadata to determine logical file structures of data stored on the storage system by the host system, executable code running exclusively on the storage system that uses machine learning to ascertain file access patterns of the logical file structure that is stored on the storage system by the host and to ascertain frequency of file backups, executable code determines portions of the logical data based on the logical file structure of data stored on the storage system and the file access patterns and frequency of file backups, and executable code that directly transfers only the portions of the logical data based on the logical file structures from the storage system to the backup system.

18. The logical backup system, according to claim 17, wherein the file metadata also includes file attributes.

* * * * *